J. M. LUDLOW & S. C. PRUITT.
Circular-Toothed Pulverizer and Cultivator.
No. 197,784. Patented Dec. 4, 1877.
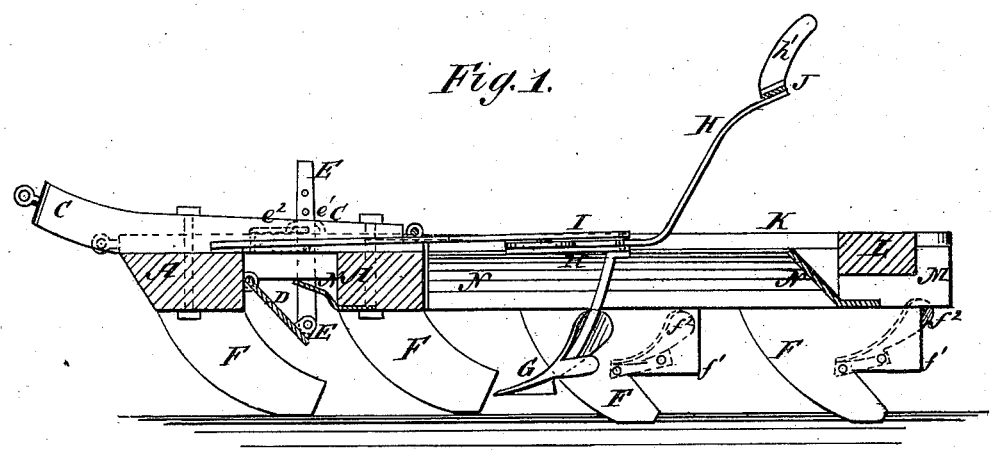
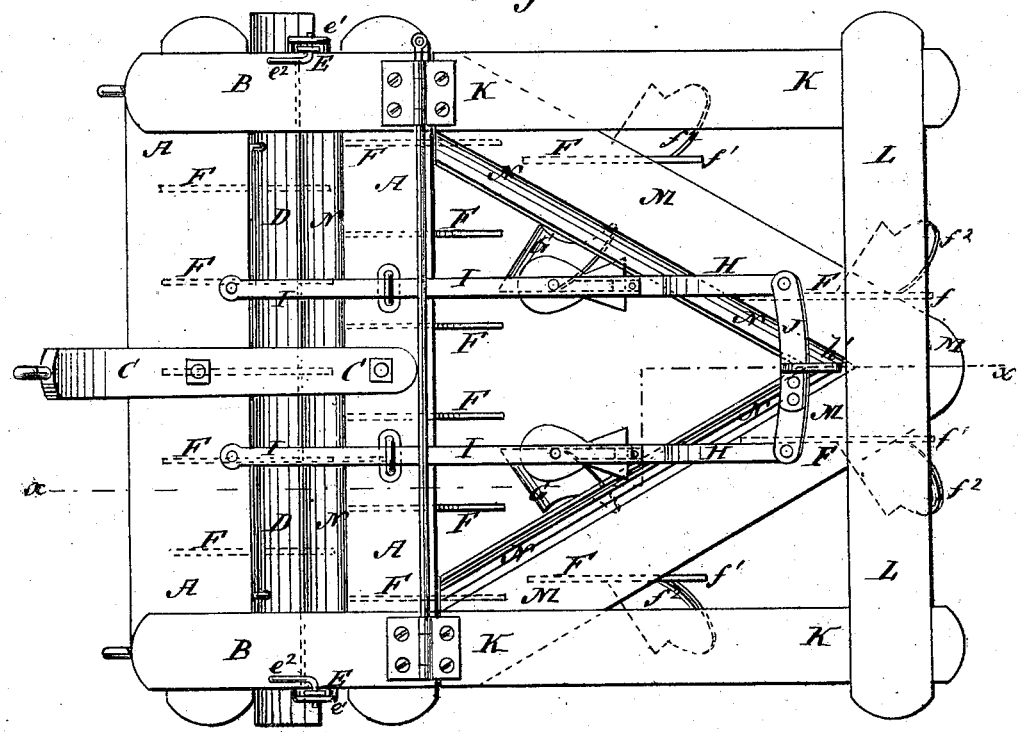
WITNESSES:
E. Wolff
J H Scalborough
INVENTORS
J. M. Ludlow
S. C. Pruitt
BY Munn
ATTORNEYS.

UNITED STATES PATENT OFFICE.

JOHN M. LUDLOW AND SANFORD C. PRUITT, OF HALL, INDIANA.

IMPROVEMENT IN CIRCULAR-TOOTHED PULVERIZER AND CULTIVATOR.

Specification forming part of Letters Patent No. 197,784, dated December 4, 1877; application filed July 30, 1877.

*To all whom it may concern:*

Be it known that we, JOHN M. LUDLOW and SANFORD C. PRUITT, of Hall, in the county of Morgan and State of Indiana, have invented a new and useful Improvement in Circular-Toothed Pulverizer and Cultivator, of which the following is a specification:

Figure 1 is a vertical longitudinal section of our improved machine, taken through the broken line $xx$, Fig. 2. Fig. 2 is a top view of the same.

Similar letters of reference indicate corresponding parts.

The object of this invention is to furnish an improved machine for loosening the soil, cutting in pieces and pulverizing sods, clods, lumps, &c., destroying weeds, cutting in pieces cornstalks and other rubbish, slightly ridging the soil to prevent it from baking, which may also be used for marking the ground, at the same time that the soil is loosened and pulverized, and which shall be simple in construction, convenient in use, and effective in operation.

The invention will first be described in connection with the drawing, and then pointed out in the claims.

A represents two parallel cross-beams, which are connected at their ends by two short longitudinal bars, B, and at their centers by the draw-bar C. To the rear edges of the beams A are hinged the forward edges of the drag or pulverizing plates D, only one of which is shown in the drawing.

To the ends of the rear or free edge of the plate D are pivoted the lower ends of the bars E, which pass up through keepers $e^1$ attached to the bars B, and have a number of holes formed through them to receive pins, bolts, or hooks $e^2$ to fasten the plate D in any position into which it may be adjusted. The plate D breaks in pieces and pulverizes the clods, sods, lumps, &c., and at the same time serves as a gage to regulate the depth to which the teeth F enter the soil.

The lower parts of the teeth F are made thin, curve to the rearward in circular form, and have their forward curved edges made sharp, so that they will readily enter the soil, and cut in pieces sods, clods, lumps, stalks, roots, and other rubbish upon and below the surface of the ground, while their peculiar form prevents them from becoming clogged, from pulling out anything that may be beneath the said surface, and enables them to pass over obstructions.

The shanks of the teeth F are designed to pass up through the beams A, and be secured by nuts screwed upon their ends. The teeth F are arranged upon the beams A alternately, and may be at any desired distance apart.

G represents two marking-plows, the standards of which are attached to the bars or levers H at a little distance from their forward ends.

The forward ends of the bars or levers H are pivoted to the bars I at a little distance from their rear ends. The bars I pass through keepers attached to the rear beam A, and their forward ends are bolted to the forward beam A.

The bars or levers H are curved upward and rearward, and to their rear ends are pivoted the ends of a connecting-bar, J, which serves as a handle for guiding the plows G, or has a handle, $h'$, attached to it.

With this construction the plows G may be used for marking the ground or cultivating plants, while the soil is loosened by the teeth F and pulverized by the plates D.

The marking-plows G are made with the mold-boards and bars in one piece, and with the forward parts of the lower edges of the said bars or land-sides concaved or hollowed, as shown in Fig. 1.

When used for cultivating plants the middle teeth F and plates D should be detached. To the rear ends of the bars B are hinged the forward ends of the bars K, the rear ends of which are connected by a cross-bar, L.

To the forward ends of the bars K are attached the forward ends of the beams M, the rear ends of which meet at an angle, and are attached to each other and to the center of the cross-bar L.

The bars K L are designed to strengthen the inclined beams M, and need not necessarily be used. When the bars K L are not used the forward ends of the beams M are hinged directly to the rear ends of the bars B.

To the forward and rear parts of the inclined beams M are attached curved teeth F, which are made with rearward projections $f^1$ upon their upper parts, to which are attached mold-boards $f^2$, to move the upper part of the soil laterally and destroy weeds and grass.

The teeth or plows F $f^1$ $f^2$ are so arranged that the rear plows will partially fill the furrows opened by the forward ones, and thus leave the ground slightly uneven or ridged, to prevent it from baking.

The forward edges of the beams A M are inclined, or have inclined plates N attached to them, to press down and crush sods, clods, and lumps, and prevent them from collecting in front of said beams. The pivot of the hinges that connect the rear part of the frame-work to the forward part is a long rod, so that it can be readily withdrawn to detach said rear part when desired.

Having thus described our invention, we claim as new and desire to secure by Letters Patent—

1. The thin rearwardly curved or circular teeth F, provided with the rearward projections $f^1$ and the mold-boards $f^2$, for loosening the soil, cutting in pieces sods, clods, lumps, stalks, &c., destroying weeds, and moving the soil laterally, substantially as herein shown and described.

2. The combination of the inclined beams M and the teeth F $f^1$ $f^2$, with the beams A, the bars B, and the teeth F, substantially as herein shown and described.

JOHN M. LUDLOW.
SANFORD C. PRUITT.

Witnesses:
WILLIAM A. SMITH,
SYLVESTER JOHNSON.